(No Model.) 2 Sheets—Sheet 1.

J. P. GILL.
Apparatus for the Combustion of Gases and Vapors.

No. 241,208. Patented May 10, 1881.

Witnesses:
A. Berney
Wm. H. Gronelle

Inventor:
Jos. Pearson Gill

N. PETERS, Photo-Lithographer, Washington, D. C.

(No Model.)　　　　　　　J. P. GILL.　　　　2 Sheets—Sheet 2.
Apparatus for the Combustion of Gases and Vapors.
No. 241,208.　　　　　　　　　Patented May 10, 1881.
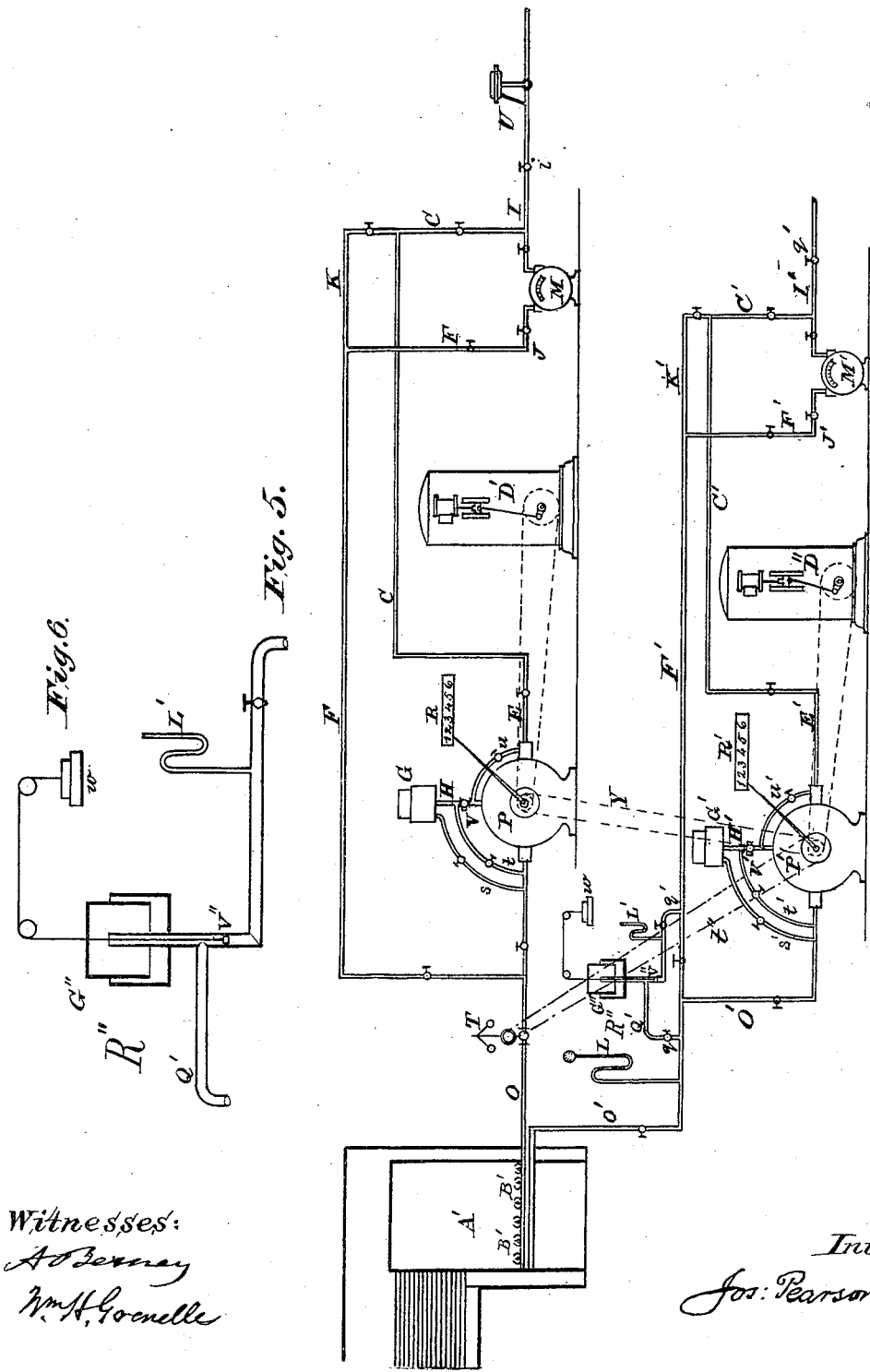
Witnesses:　　　　　　　　　　　　　　　Inventor:

UNITED STATES PATENT OFFICE.

JOSEPH P. GILL, OF NEW YORK, N. Y.

APPARATUS FOR THE COMBUSTION OF GASES AND VAPORS.

SPECIFICATION forming part of Letters Patent No. 241,208, dated May 10, 1881.

Application filed February 28, 1881. (No model.)

*To all whom it may concern:*

Be it known that I, JOSEPH PEARSON GILL, of the State, county, and city of New York, have invented certain new and useful Improvements in Apparatus for the Combustion of Gases and Vapors; and I do hereby declare that the following is a full, clear, and exact description of the invention, which will enable others skilled in the art to which it pertains to make and use the same, reference being had to the accompanying drawings, and to the letters of reference marked thereon, which form part of this specification.

The nature of my invention consists in improvements in apparatus for the combustion of gases and vapors in a close combustion-chamber, for heating dwellings and other buildings, furnaces, boilers, stoves, and ranges, which includes burners constructed for the purpose of combining gases and vapors with air in definite and regulated proportions at the point of combustion, independent automatically-operated pressure-regulators on the gas and air supply pipes, by which the relative quantities of the gases and air are automatically maintained, the total quantity of gas and air used being varied at pleasure without suspending of work or change of apparatus, and means for operating the same, of which the following is a description, illustrated by the accompanying drawings.

The gases and vapors used by me are produced by means of the process and apparatus for which Patents Nos. 171,117 and 179,474 have been granted to me, and others for which application has been made, or I may obtain them in any other suitable manner; and I also use a heating apparatus, as shown in Patent No. 179,760, granted to me June 13, 1876, or make use of any other furnace constructed for heating purposes.

The burners employed by me for heating purposes are illustrated in Figures 1 to 4, the same letters being used to indicate similar parts.

Figure 1:
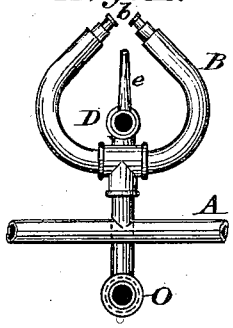
Figure 2:
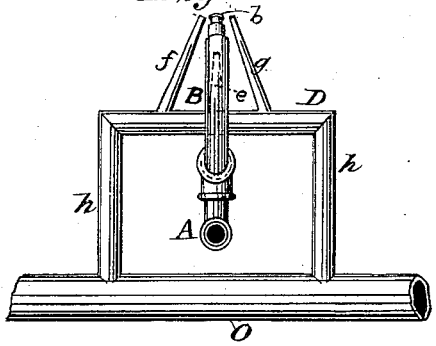

Figs. 1 and 2 represent a double burner, B, in which the flames are made to impinge upon each other.

A is a gas-pipe, through which the gas passes for the supply of the burner or burners.

D is a pipe through which air is forced by an air-pump.

O is the main air-pipe leading from the pump P, Fig. 5.

$h\ h$ are branch pipes connecting the pipe D with the main pipe O.

$e$ in Figs. 1 and 2 is an outlet-pipe from D, situated below the tips $b$ of the burner B, through which outlet-pipe air is supplied and caused to mix with the gas as it escapes from the tips $b$.

$f$ and $g$, Fig. 2, are outlet-pipes from D, which supply the needed quantity of air to the gas-flame to insure perfect combustion, which takes place in a close chamber having an outlet for the products of combustion.

Figure 3:
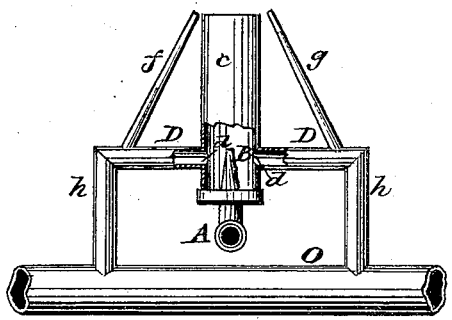
Figure 4:
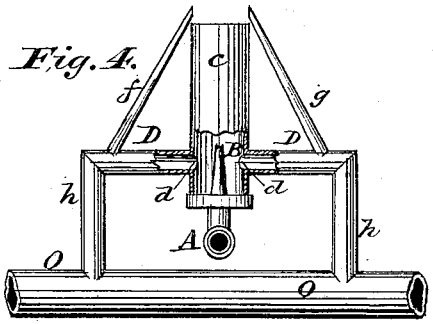

Figs. 3 and 4 represent a burner similar to a Bunsen burner, $c$ being the cylinder or passage in which the gas escaping from the burner B is mixed with air entering through the holes $d\ d$, the air being supplied to the holes through the pipe D.

$f$ and $g$ are the outlet-pipes, which supply the requisite quantity of air to the flame at the top of the cylinder $c$ for the perfect commingling and combustion of the gas, as above mentioned.

The apparatus shown on Figs. 3 and 4 may be composed of fire-brick or any similar material to better enable it to withstand heat.

On Fig. 5, P is a rotary pump for supplying the gas to the burners B' B' in the furnace A' for heating purposes.

G is a compensator on the pump, consisting of a float in a tank and a valve, V, in the pipe H, connecting the tank with the pump. The float is operated by the pressure of the gas in the outlet-pipe O through the pipe $s$. When the gas is supplied in excess and the pressure in the pipe O is increased above the point fixed by the weights on the float in G, the float is raised and the valve V is opened wider, allowing a larger return of the gas through the pipe $t$, valve V, and pipe $u$ to the inlet-pipe E of the pump. When the pressure in the outlet-pipe O falls below the normal limit the float in G falls and the valve V partially closes, and a smaller quantity of gas returns to the inlet of the pump. By this means a uniform pressure and regulated supply of gas is maintained in the pipe O and at the burners B' B' in the furnace A'.

R is the register to record the number of revolutions of the pump, by which the quantity of gas passed is made known.

D' is the engine for working the pump.

M is a meter for recording the quantity of gas used.

C is a pipe leading from the inlet I of the meter to the inlet E of the pump, through which the gas passes without passing through the meter when desired.

F is a pipe leading from the outlet J of the meter to the outlet-pipe O of the pump, by which means the gas may be used without passing through the pump.

P' is a similar rotary pump for supplying air instead of gas to the burners B' B' in the furnace A', the air being used for the purpose and substantially in the manner stated in the description of said burners hereinbefore given, the door of the ash-pit being closed to prevent the admission of air in any other manner.

G' is the compensator on the pump, which is operated by the pressure of the air in the outlet-pipe O' of the pump.

R' is the register.

D'' is the engine for working the pump; M' the meter for recording the quantity of air passed. The air may by-pass the meter through the pipe C', or may by-pass the pump through the pipe F', or it may by-pass both meter and pump through the pipe C' K' F'.

B' B' are burners in furnace A', similar to those hereinbefore described for heating purposes.

With suitable connections, such as the connecting-belt at Y between revolving parts, one of the engines D' D'' may be dispensed with.

By means of the independent automatically-regulated supply devices P P', I vary the relative quantities of the gases and air at will by changing the weights or their equivalents on the compensators G and G', thus increasing or diminishing the quantity of gas or air, respectively, and the relative proportion having been adjusted, that proportion is thereafter automatically maintained, notwithstanding any variations in the speed of the engine or in the number of burners used, and at the same time the total quantity of gas and air used may be varied at pleasure by adding to or removing simultaneously equal weights from the compensators, these changes being made without any interruption of the work. Thus by these independent automatic devices any definite relative proportion of gas and air required by the object to be attained is obtained and maintained with ease and certainty.

When the gas-pump P is not used I attach to the gas-pipe O a governor, T, which is connected with the air-pump P' by a suitable connection, as at t''.

By changing the weights or their equivalents on the compensator G', and by adjusting the balls or their equivalent on the governor T, I vary at will the relative proportion between the gas and air used, which is thereafter automatically maintained, as hereinbefore described.

I also attach to the gas-supply pipe an automatic regulating device, U, and valve i, by means of which the quantity of gas supplied is regulated and automatically maintained.

The admission of air through the pipe O', I also regulate, without the use of the pump P', by means of the automatic regulator R'', attached to the air-supply pipe O', and a pressure or vacuum gage, L, the draft of the chimney or stack being the motive power. This regulator consists of a float, G'', in a tank, valve V'', and weight w, Fig. 6. When the draft is in excess the float G'' drops, partially closing the valve V'', and thus preventing too large a supply of air to the burners B'. Should the draft fall below the required point, as shown by the pressure-gage L', the weight w causes the float to rise and the valve to open more widely, thus allowing a larger supply of air to enter the pipe O'. Any other suitable governor that will admit a larger supply of air as the draft diminishes and reduce the supply as the draft increases, so as to maintain a uniform supply, may be used.

The pressure is regulated by weights w, or a spring or other suitable device. This regulator is attached to the inlet-pipe O' at the points q and q' in Fig. 5. When the pressure in the pipe O' and the size of the pipe are known, the quantity of air passing is also known. A meter, as at M', may also be used to register the quantity of air passed. By adjusting the weights or their equivalent on the regulator U, attached to the gas-supply pipe, and the weights w on the regulating device R'', attached to the air-supply pipe, the relative quantity of the gas and air is regulated at pleasure, which is thereafter automatically maintained by the action of the two regulating devices.

When the automatically-regulated supply-pump P is used and the pump P' is omitted, the regulating apparatus R'' on the air-supply pipe is used by adjusting the compensator at G and the weights w at G'', the relative supply of gas and air being regulated at pleasure and thereafter automatically maintained.

In all cases in the use of these several different automatic regulating devices, while the adjusted relative quantities of the gas and air are automatically maintained, the total quantity used may be varied at pleasure by adding to or removing from them simultaneously equal weights, or by simultaneously adjusting their equivalents, the changes being effected without interruption of the work or removing or replacing any part of the apparatus or interfering with the motor. As different kinds of gas and vapor of different densities require different quantities of air for their combustion and treatment, the combination of regulating devices, substantially as herein described, is requisite, and enables the combination of materials to be made effectively and without delay. The practical result of this method is a perfect and unfailing combustion of the combined materials without smoke deposits and obstructions, giving the full calorific power of which the materials used are capable, and also the power to vary the quality of the flame to suit the heating purposes required.

I am aware that many devices are known to the art for the purpose of combining gases and vapors and air in order to obtain better results in heating; but the apparatus thus far shown fails to give the power to accomplish in a practical manner the objects named, nor has there been shown an effective system of devices for automatically and simultaneously regulating the relative and total quantities of the gas and vapor and air used, and also capable of adjustment for varying the air and gas supply at will; and hence to produce these results the necessity has continued to exist for the method and apparatus herein presented, which is easily managed, and is automatic in use and certain in operation.

I do not here claim the special regulators and compensators and forcing devices herein described, these and other matters described in this specification being the subject-matter of other applications now pending in the Patent Office; but What I do claim, and desire to secure by Letters Patent, is—

1. In combination, a close combustion-chamber, an air and gas mixing burner, an air-pipe and a gas-pipe, each having means for varying its capacity of supply at will, and an independent automatically-operated pressure-regulator, whereby the relative supply of air and gas can be adjusted and automatically maintained, substantially as set forth.

2. The combination, as herein described, whereby the air for combustion is wholly supplied, of a combustion-chamber, an air-pipe provided with valves, a pressure-gage, an automatic regulator, and a meter, substantially as set forth.

3. The combination, as herein described, whereby the air for combustion is wholly supplied, of a combustion-chamber, an air-pipe provided with valves, a pressure-gage, an automatic regulator, a meter, and by-pass, substantially as set forth.

4. The combination of a burner, a gas-pipe provided with an automatically-regulated forcing device, an air-pipe provided with an automatically-regulated forcing device, meters, and by-passes, substantially as set forth.

5. The combination of a burner, a gas-pipe provided with an automatically-regulated forcing device and an engine, an air-pipe provided with an automatically-regulated forcing device and an engine, meters, and by-passes, substantially as set forth.

6. The combination of a burner, gas and air supply tubes, an automatically-regulated air-forcing device, a governor on the gas-supply pipe connected with the air-forcing device, meters, and by-passes, substantially as set forth.

7. The combination of a burner, gas and air supply tubes, an automatically-regulated gas-forcing device, an automatically-regulated air-forcing device, connecting-belt Y, meters, and by-passes, substantially as set forth.

8. The combination of a burner, gas and air supply pipes, an automatically-regulated gas-forcing device, an automatic air-regulating device, meters, and by-passes, substantially as set forth.

9. The combination of a burner, gas and air supply pipes, an automatic gas-regulating device, an automatic air-regulating device, meters, and by-passes, substantially as set forth.

10. In an apparatus for heating dwellings and other buildings, furnaces, stoves, and ranges, the combination of furnace A', burners B', pipe O', pressure-gage L, and automatic regulating device R'', for the purpose of regulating in a natural draft the supply of air to burners for heating, meter, and by-pass, constructed and connected substantially in the manner herein described and set forth.

11. In an apparatus for heating purposes, the combination of furnace A', burners B', air-pump P', gas-pump P, connecting-belt Y, compensators G and G', registers R and R', meters M and M', and by-passes C F K and C' F' K', constructed and connected substantially in the manner herein described and set forth.

12. In an apparatus for heating purposes, the combination of furnace A', burners B', air-pump P', compensator G', pipe O, governor T, connection t'', meters M and M', and by-pass C and C', constructed and connected substantially in the manner herein described and set forth.

13. In an apparatus for heating purposes, the combination of furnace A', burners B', air-pump P', compensator G', pipe O, governor T, connection t'', register R', and by-pass F, meters M and M', and by-passes C and C', constructed and connected substantially in the manner herein described and set forth.

14. In an apparatus for heating purposes, the combination of furnace A', burners B', pipe O', pressure-gage L, automatic regulating device R'', by-pass C', and meter M', for the purpose of regulating in a natural draft the supply of air to burners for heating, constructed and connected substantially in the manner herein described and set forth.

15. In an apparatus for heating purposes, the combination of furnace A', burner B', gas-pipe O, gas-pump P, compensator G, air-pipe O', pressure-gage L, automatic regulating device R'', meters M and M', and by-passes C and C', substantially as set forth.

16. In an apparatus for heating purposes, the combination of furnace A', burner B', pipes O O', pressure-gage L, automatic regulating air device R'', automatic regulator U, meters M and M', and by-passes C and C', constructed and connected substantially in the manner herein described, and for the purpose set forth.

17. In an apparatus for heating purposes, a burner for the purpose of combining gas and vapor and air for combustion, composed of the following parts: a hollow gas tube or pipe having for an outlet a small discharge-pipe, B, situated in a cylinder or passage-way, c, in which air is commingled with the gas, air pipes or conduit D, connected with an air-supply pipe, O, to supply air to the cylinder c through the holes d, and also having branch pipes or conduits f and g, for the purpose of discharging the air required for the perfect combustion of the commingled gas and air at the outlet of the cylinder c, constructed substantially in the manner herein described, and for the purpose set forth.

18. In an apparatus for heating purposes, the combination of a furnace, A', burners B', gas-pipe O, gas-pump P, compensator G, register R, engine D', governor T, regulator U, and valve i, meter M, by-passes C K F, air-pipe O', air-pump P', compensator G', register R', engine D'', connecting-belts Y and t'', pressure-gage L, automatic regulating device R'', meter M', and by-passes C' K' F', connected and constructed substantially in the manner herein described, and for the purpose set forth.

In testimony that I claim the foregoing as my own I affix my signature in presence of two witnesses.

JOSEPH PEARSON GILL.

Witnesses:
 JOSEPH W. BEATLEY,
 CHAS. G. HANKS.